US012671604B2

(12) United States Patent (10) Patent No.: US 12,671,604 B2
Frost et al. (45) Date of Patent: Jun. 30, 2026

(54) BUS CONTROLLED LIGHTING SYSTEM

(71) Applicant: Melexis Technologies NV, Tessenderlo (BE)

(72) Inventors: Raik Frost, Erfurt (DE); Jens Röpcke, Erfurt (DE); Thomas Freitag, Erfurt (DE); Michael Bender, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 344 days.

(21) Appl. No.: 17/747,154

(22) Filed: May 18, 2022

(65) Prior Publication Data

US 2022/0376949 A1 Nov. 24, 2022

(30) Foreign Application Priority Data

May 21, 2021 (EP) .................................... 21175177

(51) Int. Cl.
*H04L 12/40* (2006.01)
*H04L 45/745* (2022.01)
(Continued)

(52) U.S. Cl.
CPC ...... *H04L 12/40006* (2013.01); *H04L 45/745* (2013.01); *H04L 67/12* (2013.01); *H05B 47/18* (2020.01); *H04L 2012/40234* (2013.01)

(58) Field of Classification Search
CPC ... H04L 12/40006; H04L 67/12; H05B 47/10; H05B 37/0272; H04B 47/18
See application file for complete search history.

(56) References Cited

U.S. PATENT DOCUMENTS 6,374,373 B1 4/2002 Heim et al.
2012/0013252 A1* 1/2012 Eckel ..................... H05B 47/18
315/210

(Continued)

FOREIGN PATENT DOCUMENTS

DE 102012220187 A1 5/2013
DE 102018104591 B4 3/2021
(Continued)

OTHER PUBLICATIONS

Extended European Search Report from corresponding European Application No. 21175177.1, Dec. 17, 2021.

*Primary Examiner* — Derrick W Ferris
*Assistant Examiner* — Won Jun Choi
(74) *Attorney, Agent, or Firm* — Workman Nydegger

(57) ABSTRACT

A lighting system includes a master node, one or more gateway nodes, a first communication bus connecting the one or more gateway nodes to the master node, a plurality of slave nodes such that each slave node is connected to a lighting source and is arranged for conveying data messages, and one or more second communication buses, each connecting one of the gateway nodes with one or more slave nodes of the plurality. The master node is arranged for conveying a unique network address to the one or more gateway nodes via the first communication bus, and the one or more gateway nodes are arranged for conveying a unique network address to the plurality of slave nodes via one of the second communication buses. At least one gateway node is arranged for storing a lighting plan for lighting one or more slave nodes connected to that gateway node.

15 Claims, 8 Drawing Sheets

(51)  Int. Cl.
    *H04L 67/12*          (2022.01)
    *H05B 47/18*         (2020.01)

(56)            References Cited

U.S. PATENT DOCUMENTS

| | | | |
|---|---|---|---|
| 2013/0249442 | A1 | 9/2013 | Piper |
| 2017/0359195 | A1* | 12/2017 | Bender ............ H04L 12/40006 |
| 2018/0227147 | A1 | 8/2018 | Kataoka et al. |
| 2018/0354416 | A1* | 12/2018 | Ishikawa .................. B60Q 3/80 |
| 2020/0145252 | A1* | 5/2020 | Torisaki .................. H04W 4/40 |
| 2022/0038305 | A1* | 2/2022 | Vivar ................. G06F 13/4282 |

FOREIGN PATENT DOCUMENTS

| | | | |
|---|---|---|---|
| EP | 3258652 | A1 | 12/2017 |
| EP | 2539768 | B1 | 6/2018 |
| EP | 3478031 | A1 | 5/2019 |

* cited by examiner

BUS CONTROLLED LIGHTING SYSTEM

FIELD OF THE INVENTION

The present invention is generally related to the field of lighting systems forming a serial network comprising a plurality of nodes which are interconnected via a data bus.

BACKGROUND OF THE INVENTION

Illumination systems, amongst others those for lighting applications in vehicles without being limited thereto, often make use of LED technology. LED technology is typically advantageously used since the production of LED illumination sources is inexpensive and the energy consumption of LED illumination sources is low.

Control of illumination systems in automotive applications should be robust and fail-proof. For example, it should not be affected by external electromagnetic fields, electric peaks or other sources of noise. However, automotive environments are electrically noisy. A faulty transmission of data or an unintended activation of illumination systems can result in dangerous situations, which should be avoided.

Some prior art systems establish connection between different LED light nodes and their controllers by a LIN bus system. The Local Interconnect Network (LIN) bus standard is a well-known protocol defined for use in communication between a number of distributed modules. The LIN standard defines a relatively low cost, serial communication network. LIN is a complement to other automotive multiplex networks, including the Controller Area Network (CAN), but it targets applications requiring networks that do not need excessive bandwidth, performance or extreme fault tolerance.

Such LIN communication standard typically refers to systems in which a plurality of similar modules are used on a common bus line, and in which each module may need to be addressed individually. A LIN serial bus system comprises a master node that is connected via a wired connection, e.g., by a single data wire forming a common signal conductor, to one or more slave nodes. Thus, the master node and slave node(s), connected by the data wire, form a network cluster. Each node in the cluster may have a unique identity, which may be programmed as a unique identifier in the node or assigned to the node by an auto-addressing method as known in the art. This unique identity enables the master node to communicate with a selected slave node or group of slave nodes. A drawback of a LIN based solution is that the number of LEDs that can be controlled, is quite limited.

Other prior art systems provide connection between different LEDs and their controllers by a Controller Area Network (CAN) system. However, setting illumination systems directly in CAN is complex, difficult to repair or interchange in case of failure or accident, and the implementation is expensive.

Therefore also other bus systems, as shown in e.g., EP3478031, have been disclosed, wherein some of the mentioned disadvantages of a LIN system or a CAN system are avoided. The system disclosed in EP3478031 is cheaper in implementation than a CAN system, provides a high bandwidth and can connect a high number of slave nodes to a master device. However, it is still more expensive than a simple LIN bus as it is based on a two-wire communication, whereas a LIN bus has only a single wire.

In EP3258652 a LIN system is shown, which overcomes the problem of the limited number of slave nodes to be addressed in an illumination system. However, the communication bandwidth is still limited to the bandwidth of a LIN Bus.

New lighting or illumination systems need to be integrated in existing architectural platforms of e.g., vehicles, wherein in the nodes existing interfaces are used like for instance a LIN interface of a LIN master node. Such systems need to be able to deal with lighting or illumination scenarios with a high adaptation rate of brightness and/or colour, which request a bus with sufficient bus communication bandwidth.

Such a system may easily occur, as vehicle manufacturers upgrade in a regular way sub-networks like e.g., interior lighting systems, but they do not upgrade the whole vehicle network architecture. This implies that for instance a dynamic light application, which is characterized in a high adaptation rate of brightness and/or colour, is connected to a slow LIN master interface of the body controller due to legacy reasons. The body controller is an Electronic Control Unit (ECU) that provides several control functions, e.g., exterior and interior lights, wipers, door locks, window lifters, etc.

The above-mentioned prior art solutions remain silent on how a system with e.g., a LIN interface with a bandwidth limited master device can cooperate with the slave devices to perform fast changing lighting scenarios.

US2013/249442 A1 discloses a digital sub-network interface unit including a primary digital lighting interface port to couple to a primary lighting network. An address of the digital sub-network interface unit on the primary lighting network is manually set at the digital sub-network interface unit. A secondary digital lighting interface port is coupled to a secondary lighting network. A lighting sub-network processor in the interface unit is configured to assign addresses to secondary lighting fixtures, and to receive commands from a primary digital lighting controller related to an address of the digital sub-network interface unit.

There is therefore a need for a system that is adapted to deal with scenarios wherein a low bandwidth bus is sufficient as well as with scenarios wherein a high bandwidth bus is used to deal with high adaptation rates.

SUMMARY OF THE INVENTION

It is an object of embodiments of the present invention to provide for a lighting system comprising a multitude of nodes arranged in a serial network, wherein the time required to update the network, when switching between different lighting scenarios, is reduced compared to prior art solutions.

The above objective is accomplished by the solution according to the present invention.

In a first aspect the invention relates to a lighting system comprising a plurality of nodes arranged in a serial network. The lighting system comprises:

a master node,
one or more gateway nodes,
a first communication bus connecting the one or more gateway nodes to the master node,
a plurality of slave nodes, each slave node being connected to a lighting source and arranged for conveying data messages,
one or more second communication buses, each connecting one of the gateway nodes with one or more slave nodes of said plurality, and is characterized in that the master node is arranged for conveying a unique network address to the one or more gateway nodes via the first communication bus and the one or more gateway nodes are arranged for conveying a unique network address to the plurality of slave nodes via one of the second communication buses and in that at least one gateway node is arranged for storing a lighting plan for lighting one or more slave nodes connected to that gateway node.

The proposed solution indeed allows for a faster update of the network when the lighting scenario is adapted. By putting the lighting plan (that comprises a plurality of lighting scenarios) in at least one of the gateway nodes, these gateway nodes can, once they have received their unique address on the first communication bus, transmit the messages to update the slave nodes connected to the one or more gateway nodes in parallel over the respective second communication buses.

In a preferred embodiment the first communication bus and the respective second communication buses are arranged for bidirectional communication.

In some embodiments at least one of the gateway nodes is also a slave node connected to a lighting source.

In advantageous embodiments at least one of the lighting sources comprises one or more light emitting diodes, LEDs.

Preferably one or more slave nodes connected to one of the gateway nodes which are arranged for storing the lighting plan, are arranged to control the lighting source based on the lighting plan. Advantageously the unique network address is exploited to control the lighting source.

In preferred embodiments at least one of the one or more slave nodes connected to the at least one gateway node comprises one or more lookup tables. Most preferably, the one or more slave nodes connected to the at least one gateway node all comprise the one or more lookup tables. The at least one of the one or more slave nodes is configured to calculate a light intensity value and/or colour based on the unique network address. Preferably one or more indices for the look-up table are calculated based on the unique network address.

In one embodiment all gateway nodes comprise the lighting plan.

In preferred embodiments the first communication bus and the various second communication buses are of the same type.

Advantageously, at least one of the first and the respective second communication buses is a LIN communication bus.

In embodiments of the invention the slave nodes are each implemented as an integrated circuit. The integrated circuit may comprise storage means for storing the unique network addresses and/or the lookup table.

In one embodiment the one or more gateway nodes are each implemented as an integrated circuit. The integrated circuit comprises a memory for storing the unique network addresses and/or the lighting plan and/or the one or more lookup tables.

In one aspect the invention relates to a vehicle lighting system comprising a lighting system as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
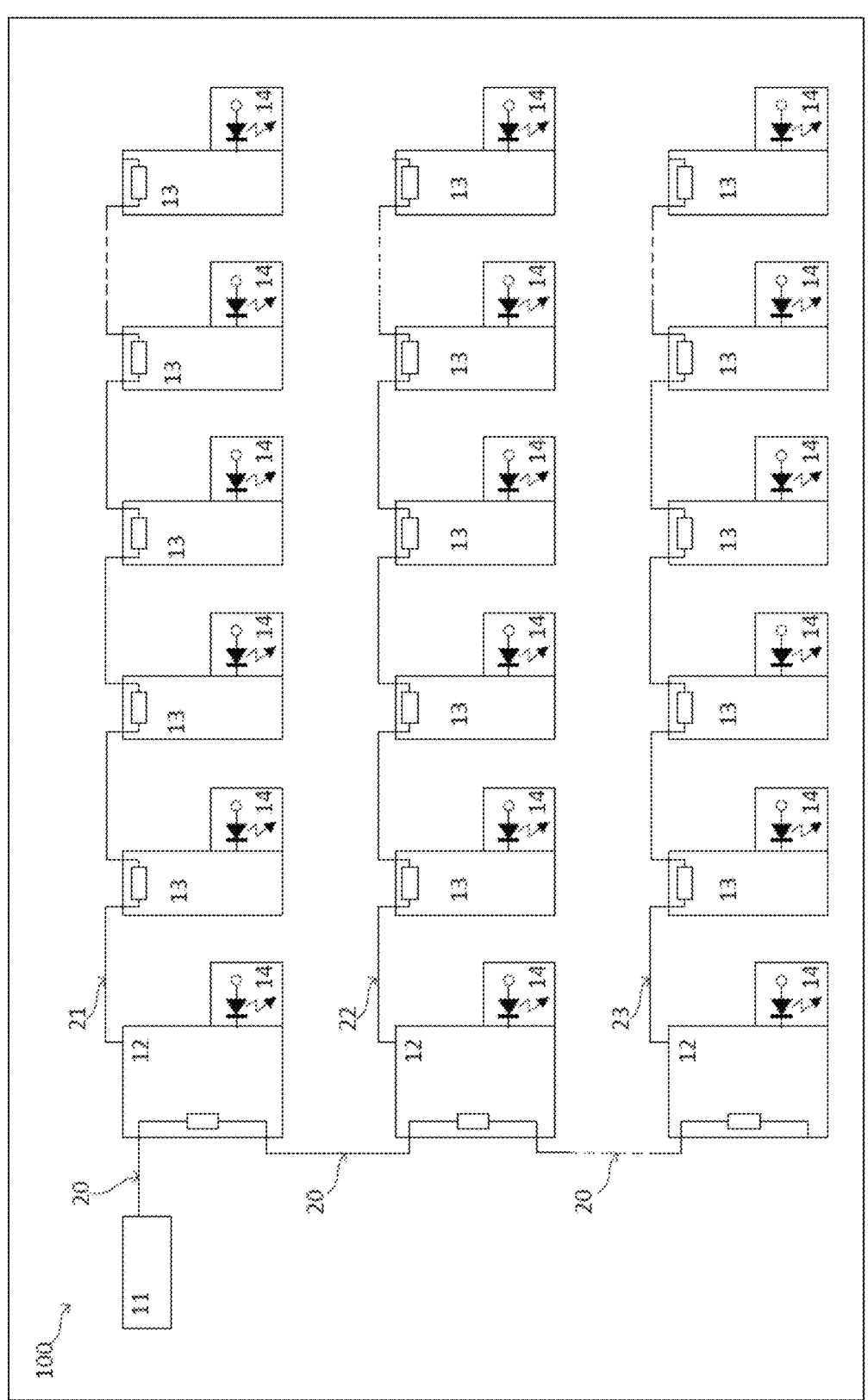
FIG. 1 illustrates an architecture of a lighting system as considered in the present invention.

The present invention will be described with respect to particular embodiments and with reference to certain drawings, but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

An architecture of a lighting system 100 designed in accordance with the present invention is illustrated in FIG. 1. A master node 11 is connected to one or more gateway nodes 12 via a communication bus 20. In the example of FIG. 1 three gateway nodes are illustrated. Each gateway node comprises at least one input pin and at least one output pin. These pins are used to provide connections which allow performing an address configuration, typically during an initialisation phase. Methods for setting an address configuration are well known in the art, one example being described in DE 10 2018 104 591 B4.

In a preferred embodiment of the lighting system of the invention the communication bus 20 is a LIN bus. In this case the gateway node(s) may for example have an architecture as the gateway device disclosed in EP3258652. In other embodiments the communication bus might be of another type, e.g. I2C, SPI, CAN or another bus system suited for performing light control.

Each of the gateway nodes provides another interface, to which further communication buses 21, 22 and 23, also referred to as sub buses, are connected. These sub buses further connect lighting nodes 13 as shown in FIG. 1. These nodes are further referred to as slave nodes. Each slave node is connected to a lighting source 14. The lighting source may for example comprise one or more light emitting diodes, LEDs. The communication sub buses 21, 22, 23 each connect one of the gateway nodes with one or more slave nodes of the plurality of slave nodes in the lighting system.

In a preferred embodiment the communication sub bus(es) connecting the gateway node(s) to one or more slave nodes is/are LIN bus(es). In other embodiments they are e.g. I2C, SPI, CAN or another suitable bus system. Preferably the first communication bus between the master node and the one or more gateway nodes and the one or more second communication buses between a gateway node and slave nodes are of the same type. It is to be noted, however, that this is not a strict requirement.

In one embodiment one or more of the gateway nodes 12 also comprise a lighting function, just as the slave nodes 13. This means that such a gateway node 12 fulfils two functions:

seen from the master node 11 it is a slave node, to which communication messages are provided. These messages are either used to control the lighting function of the gateway node 12 or used in order to transmit messages further to sub buses 21, 22, 23.

seen from the lighting nodes 13 the gateway node acts as a master device

In preferred embodiments the communication between the slave nodes and the gateway node to which the slave nodes are connected is bidirectional. Also, the communication between the master node and the one or more gateway nodes is preferably bidirectional. It is also to be noted that over a LIN bus the communication is always between a master node and one or more slave nodes and not between slave nodes without a master node being involved.

In an initialisation cycle an address configuration of the various network nodes is performed, whereby each network node receives a unique network address. In a first step each of the one or more gateway nodes receives from the master node a network address via the first communication bus 20 that connects the one or more gateway nodes to the master node. Each network address is unique on the first communication bus.

One possible way to assign network addresses in a scenario as depicted in FIG. 1, where several gateway nodes are present, each connected via a communication sub bus with one or more slave nodes, is described in the already mentioned patent document DE 10 2018 104 591 B4.

Figure 2:
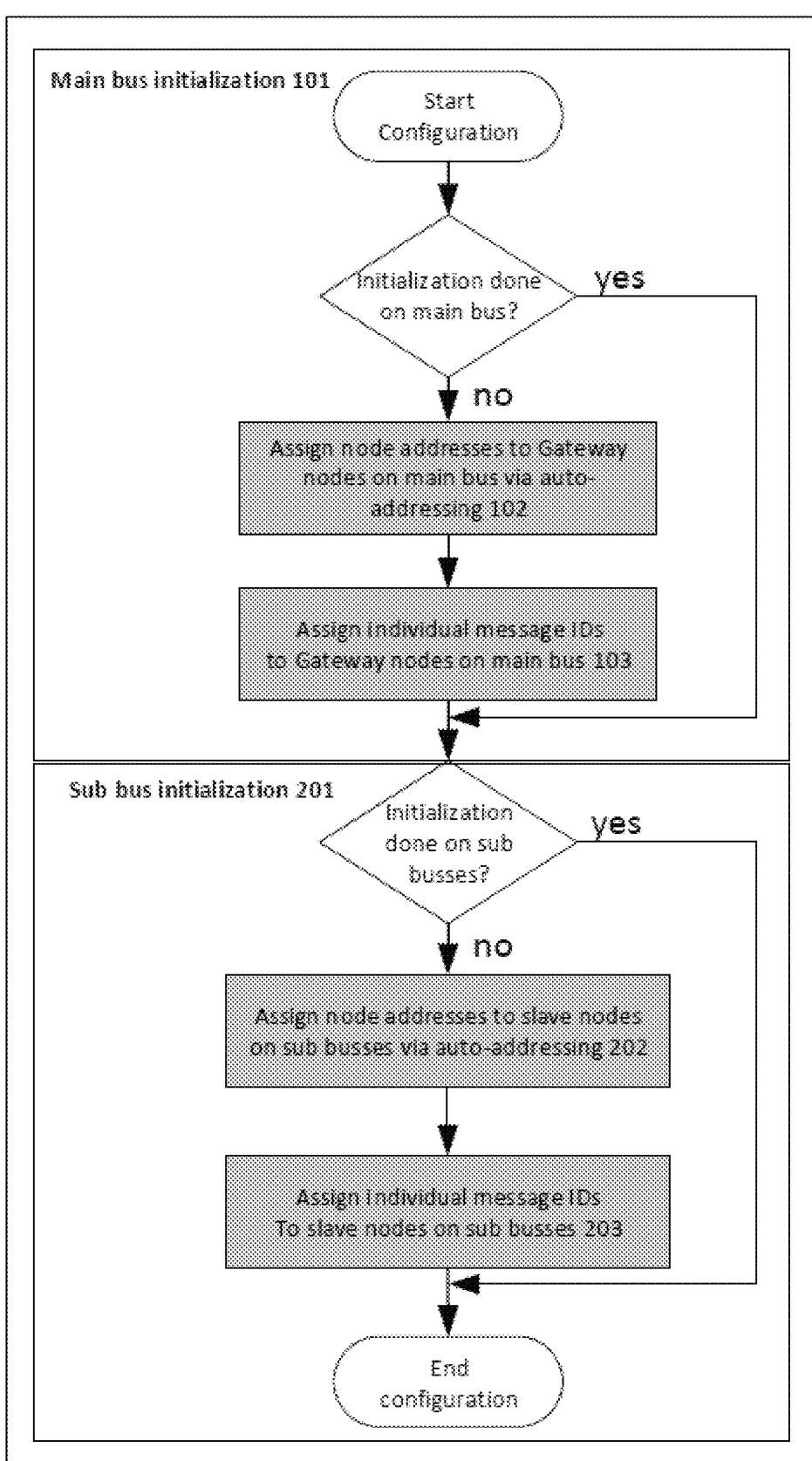
FIG. 2 illustrates a flowchart of a method for assigning network addresses to a network as in FIG. 1.

FIG. 2 provides a flowchart of another possible way of address setting that can be applied in a network set up as in FIG. 1. In a first main bus initialization step (101) each of the gateway nodes 12 receives a unique network addresses NAD (step 102) and message IDs (step 103) via the communication bus 20. This communication bus can be seen as the main bus, as all gateway nodes are connected to this bus from the master node 11. If all gateway nodes have received their unique network addresses NAD (step 102) and messages (step 103), a second sub bus initialization step (201) is performed wherein the slave nodes 13 receive their unique network addresses NAD (step 202) and message IDs (step 203) via one of the sub bus 21, 22, 23 from the gateway nodes 12, to which these sub buses are connected.

In case the main bus and/or the sub buses are LIN buses, the messages are LIN message IDs. Examples of such LIN message IDs are for instance given in ISO standard 17987-3 (Road Vehicles—Local Interconnect Network (LIN)').

Figure 3:
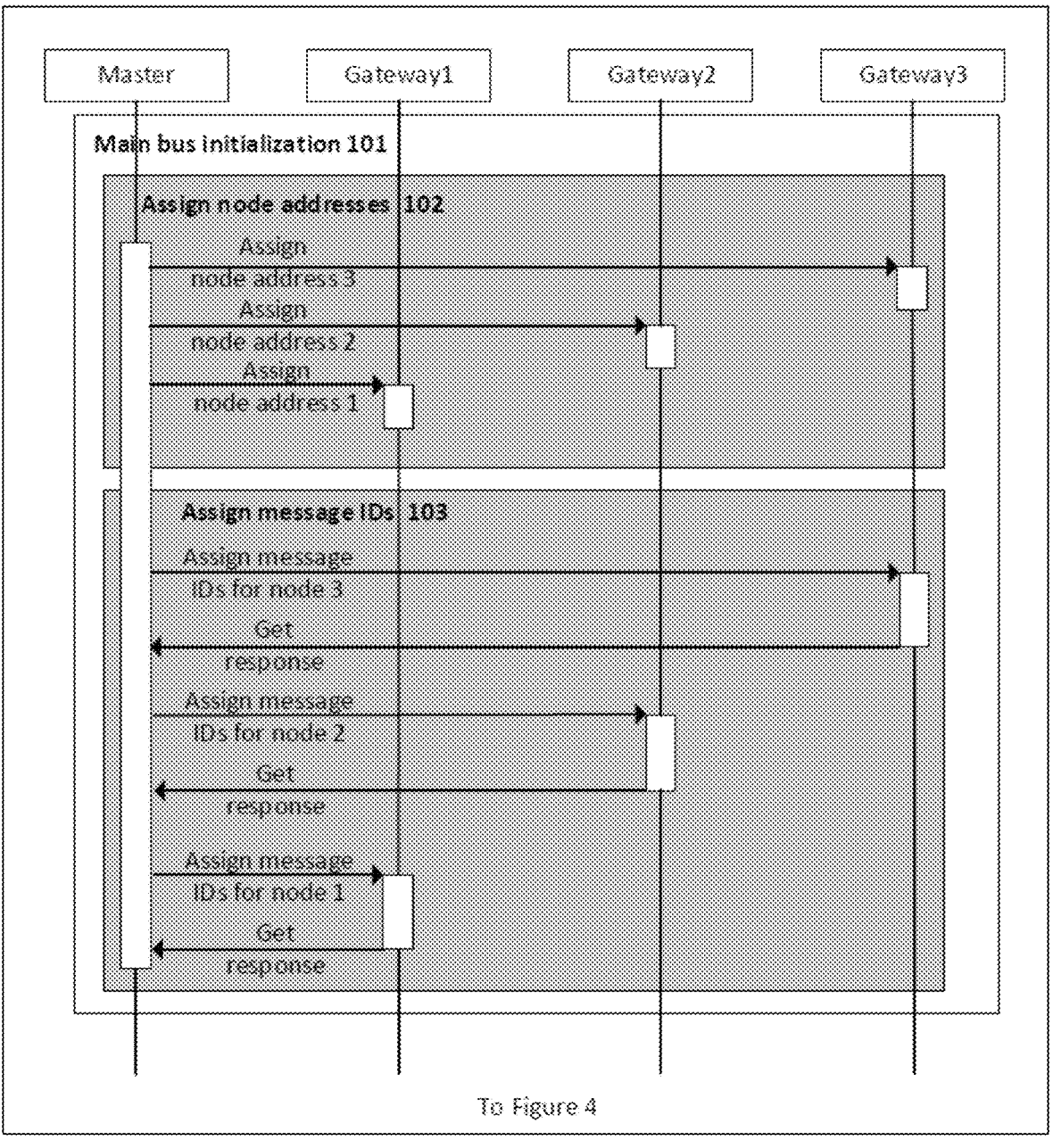
FIG. 3 illustrates a possible approach for assigning addresses and message IDs to the gateway nodes as in the network of FIG. 1.

FIG. 3 illustrates a possible way to assign the addresses to the nodes. Obviously, the different gateway nodes receive their network addresses/message IDs in a sequential way. In this example the node named Gateway3 is the first to receive its unique network address, as this node is the last connected node on the main bus. Next Gateway2 and then Gateway1 sequentially receive their unique network address NAD in the address node assignment step 102. It should be noted that this order is merely an example and that any other sequence can also be used, e.g., starting from Gateway1 to Gateway3.

After step 102 the message IDs are assigned to the gateway nodes in step 103. Also, this occurs in a sequential way. In order to check if the node address and message IDs are correctly assigned, each gateway node may in certain embodiments be arranged to send a response after that the message IDs have been set. Once all the gateway nodes have received network node addresses and message IDs the main bus initialization step (101) is finished.

Figure 4:
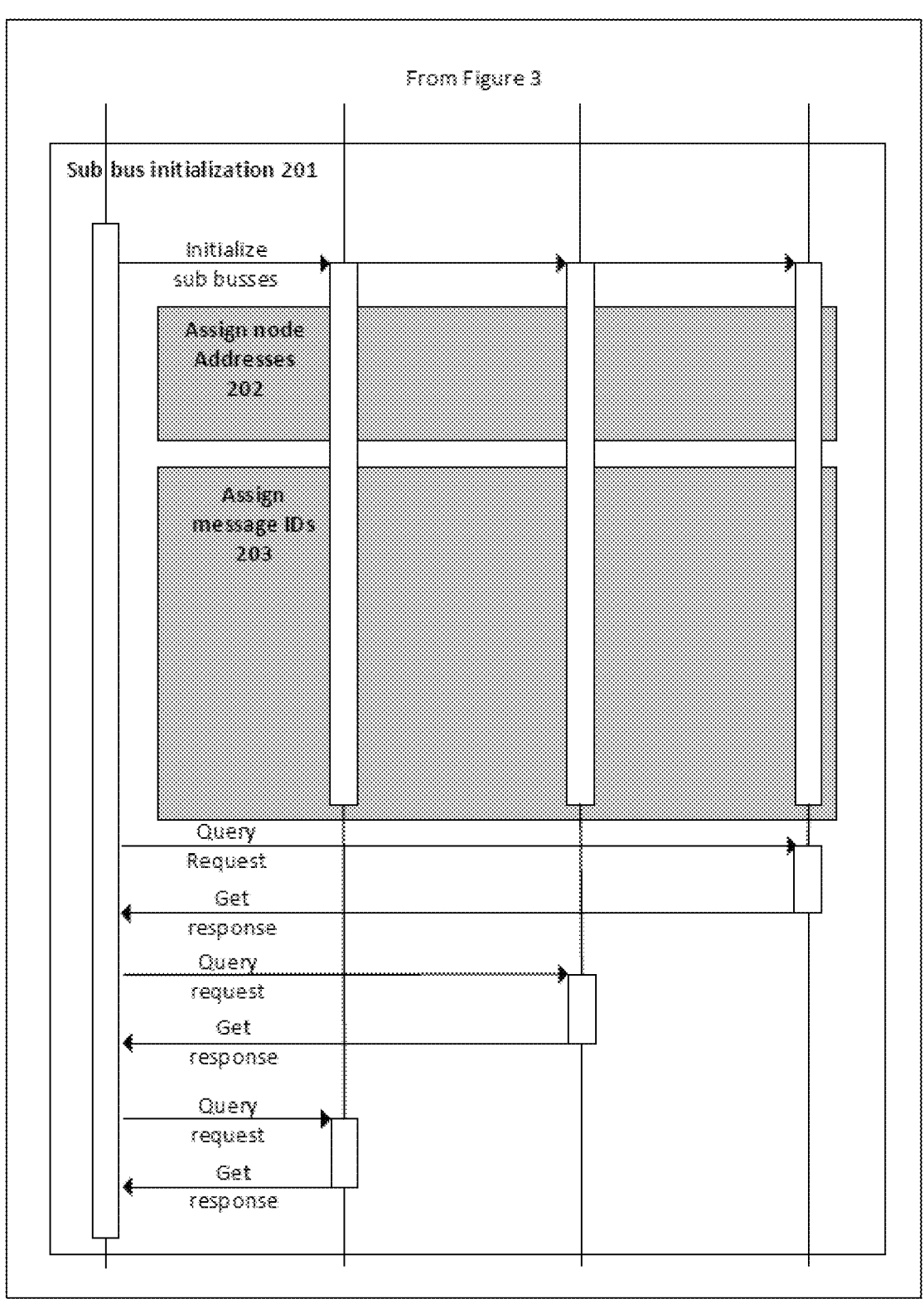
FIG. 4 illustrates a possible approach for assigning addresses and message IDs to slave nodes connected to a same gateway node.

FIG. 4 illustrates how next each of the gateway nodes provides the slave nodes to which it is connected via a communication sub bus 21, 22, 23 with a network address which is unique for the respective communication sub bus. Each of gateway nodes now starts the sub bus initialization step 201. This may be performed in parallel for two or more of the gateway nodes as this saves time in the initialization cycle. This means, all slave nodes 13 receive via the sub bus 21, 22, 23 they are connected to, a unique network address NAD and the message IDs from the gateway node that is also connected to that given sub bus. Similarly, as described above for the gateway nodes, the following sequence is applied to the slave nodes of each sub bus:

network node address setting (step 202), message ID setting (step 203),

Query request, which means each slave on request sends back information, for instance information on how many LEDs are connected to each slave. This information might further be needed for the lighting plan as later described.

While on each sub bus this sequence is running sequentially, the various gateway nodes may perform the sequence for their respective slave nodes in parallel on the various sub buses, which is very time efficient.

The number of cycles needed to perform the network address setting during the initialization phase is equal to the number of buses (first and second communication buses together). In the example of FIG. 1 four address setting cycles are needed, as there are one main communication bus and three sub buses. The address setting cycles for the sub buses preferably run in parallel, as already mentioned.

After the initialization phase each network node has a network address (NAD) that is unique on the communication bus the network node is connected to and that is also representative of its physical location in a network. That also implies that each physical location of a lighting source at e.g., a vehicle can be mapped via the unique network address of the slave node it is connected to.

In some embodiments the one or more gateway nodes are each implemented as an integrated circuit. Also, slave nodes may be implemented in an integrated circuit. The lighting sources may be connected as discrete components to the integrated circuit. In another embodiment the LEDs forming a lighting source, can be in the same package as the integrated circuit. This can be seen then as a lighting module. Preferably the unique network address NAD is stored in e.g., a non-volatile programmable memory, as for instance one-time programmable memory (OTP) or a multi-time programmable memory (EEPROM or Flash memory) of the integrated circuit (IC).

The lighting nodes 13, i.e., the slave nodes, comprise one or more lighting sources. The lighting sources are preferably LED lighting sources. Each lighting source then further comprises one or more LEDs. As already mentioned, in some embodiments also the gateway node 12 comprises a lighting source, so that it at the same time also can be considered as a slave node. The one or more LEDs of the lighting source may be of a single colour or of different colours, e.g., red, green and blue. In some embodiments one or more of the LEDs are each (separately) controllable in terms of brightness and colour in order to enable each LED lighting source to display a given lighting scenario. This scenario may be selected from a set of different lighting scenarios that are collected in what is referred to as a lighting plan.

The gateway nodes 12, the lighting nodes 13 and the network between communication buses 20, 21, 22, 23 are in embodiments of this invention arranged to drive the various lighting scenarios of the lighting plan.

In some cases the lighting scenario being applied may change at a high rate, e.g., in the order of every 50 ms over the entirety of the main communication bus and the one or more sub buses. If the communication buses are for example LIN buses, 50 ms allows just up to 5 LIN frame messages at 20 kBaud with 10 ms per LIN frame message. Typically, one LIN frame message is used for providing colour and intensity information for a single node.

Figure 5:
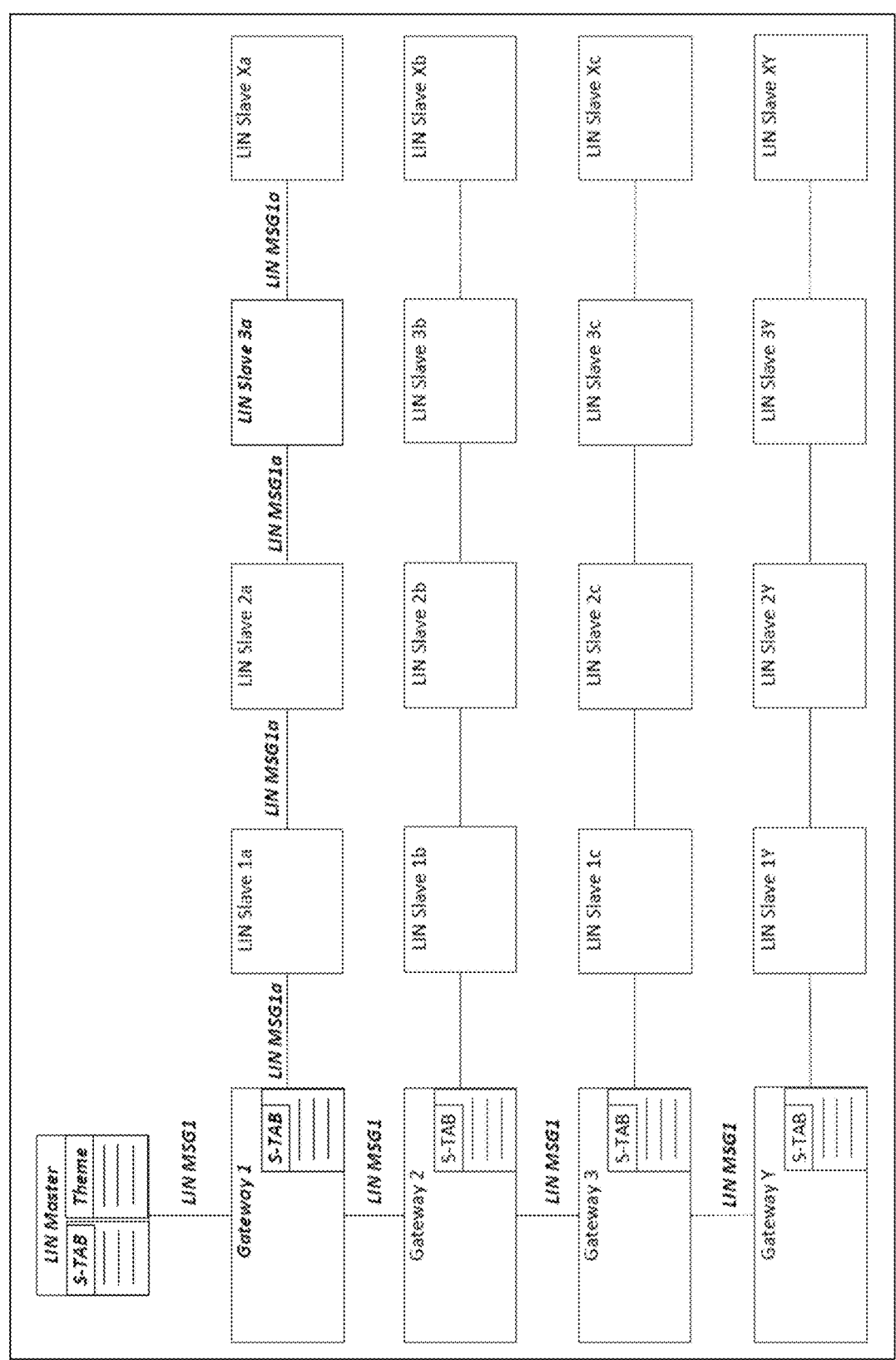
FIG. 5 illustrates a prior art solution wherein the lighting plan is stored in the master node.

In conventional solutions as known in the art the lighting plan containing the set of lighting scenarios is stored at the master node. A scenario then comprises a sequence of messages which is transmitted by the master node. One frame message is used for providing the necessary parameter information for a single node (unless a broadcast message is used). In such prior art solutions, the master node is in control of the information provided to all nodes of the lighting system. This is illustrated in FIG. 5, where the example is taken of a LIN network. As already mentioned, other types of communication buses can equally be considered. The lighting plan is in FIG. 5 indicated by the reference sign 'Theme'. In this figure the network of FIG. 1 is split in several sub networks:

Gateway1, LIN Slave 1a, LIN Slave 2a, LIN Slave 3a, . . . LIN Slave Xa, form LIN sub network a Gateway2, LIN Slave 1b, LIN Slave 2b, LIN Slave 3b, . . . LIN Slave Xb, form LIN sub network b The architecture is open and can be continued to a last sub network Y:

GatewayY, LIN Slave 1Y, LIN Slave 2Y, LIN Slave 3Y, . . . LIN Slave XY forming LIN sub network Y The lighting plan has to be translated into messages, in the example of FIG. 5 LIN frame messages which are generated or processed inside the LIN master. A processing means, for example a Central Processing Unit (CPU), in the master node fetches e.g., a complete scenario from the table representative of the lighting plan and copies it into a data buffer. This data buffer is used by a scheduler, in this example with a LIN bus a LIN scheduler, for the LIN communication, more in particular to send out the corresponding LIN frame messages. The LIN scheduler is marked in FIG. 5 as 'S-TAB'. The table in the LIN scheduler 'S-TAB' is provided by the LIN master node.

Figure 6:
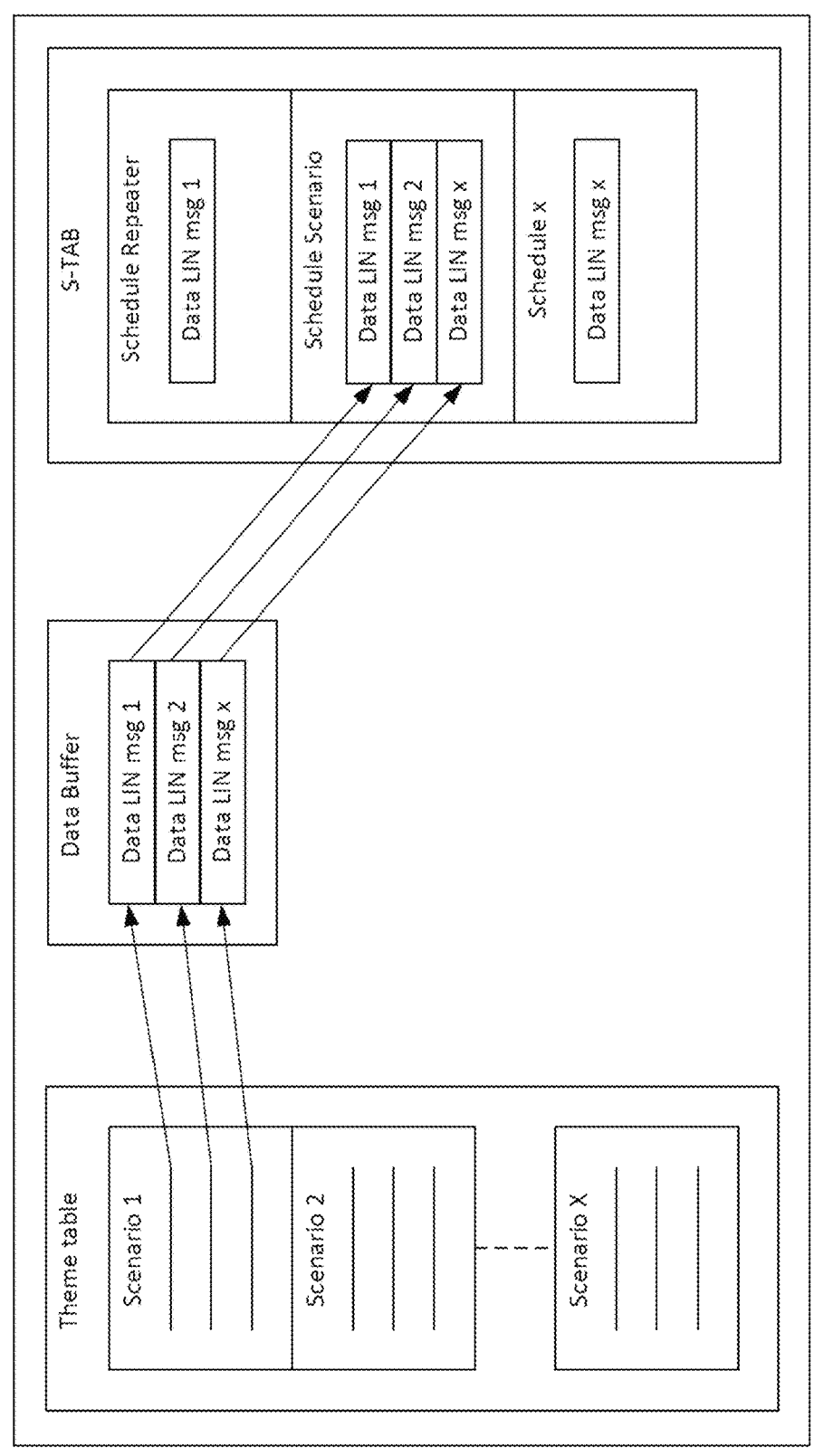
FIG. 6 illustrates the relationship between the lighting plan, data buffer and the scheduler for e.g., a LIN network.

FIG. 6 depicts the relationship between the lighting plan (Theme), the data buffer and the LIN scheduler ('S-TAB'). In a standard LIN network, the relaying of information from a master node to a slave node may in a scheme as in FIG. 5 be performed as follows. Suppose the LIN master node wants to update for instance the LED information on e.g., LIN sub bus a, LIN Slave node 3a. For that purpose, the master node copies the data buffer from the lighting plan table into a LIN scheduler and puts the information on the LIN bus via a LIN message LIN MSG1. The address of the correct network node and LED lighting source is encoded in the LIN message. Message LIN MSG1 is received by all LIN gateway nodes 12. The gateway nodes decode the received message comprising the address information. In this particular example e.g., node "Gateway1" detects in the LIN message its network address and, hence, it knows that it is addressed. LIN MSG1 is copied into a local LIN sub bus schedule table 'S-TAB' and the node forwards the message on the LIN sub bus "a" via LIN MSG 1a. All LIN slaves connected to sub bus "a" receive the message and decode it, but only LIN Slave 3a detects its address after decoding the received LIN message and lights up the connected LED(s) with the intensity and colour information as conveyed in the LIN message. The other gateway nodes (Gateways 2, 3, . . . Y) just receive LIN MSG1, but as they are not addressed, they just discard the message.

Assume for instance three gateway nodes with each of them having 10 LIN slaves connected to the LIN sub bus of each gateway node. The master has to transmit 33 LIN messages (3×gateway*10×slave) for updating the complete network. This would require up to 330 ms of time with 10 ms per LIN message.

Obviously, the method as described above is relatively slow for applications wherein lighting scenarios change quickly, given that a human eye is able to recognize single pictures with a rate of approximately 20 Hz, equivalent to a duration of 50 ms, which is much shorter than the update rate of the complete network. In other words, lighting scenarios with a 330 ms update rate would be recognized as flickering. The limited data transmission speed of the LIN bus in the above example is thus a blocking factor. Therefore, for dynamic light applications there is a need for improvement, so that scenarios with fast adaptation can be dealt with in an appropriate way, even if a relatively slow communication bus like a LIN bus is used.

The present invention therefore proposes a lighting system wherein at least one of the gateway nodes, and preferall their internal registers with RGB values and intensity value via the approach herein described. However, they do not apply it to the lighting source. Only when all slaves have received their values, they may apply it, when a given event occurs. The SigUpdateColour field (see below) can be used to implement this in certain embodiments.

A dedicated sequence of instructions (e.g., LIN messages) stored on one or more of the gateway nodes can then be triggered via the master node. The master node then comprises an overview of the possible lighting scenarios and only requests in the communication it sends, lighting scenarios to be run and controlled from the gateway nodes 12. In this case the master node initiates the complete sequence by sending just a single message intended for a particular gateway node or, in case a broadcast message, intended for all gateway nodes, and all the handling of the lighting scenario to be applied is performed locally in the slave nodes. This reduces the required amount of communication on the bus. A bus adapted for lower bandwidth communication can now also be used, which is of advantage. Also, EMC emissions, because of a lower communication rate, can be reduced.

An example of a message wherein the information (on colour, intensity and other parameters) for a specific slave node or for all slave nodes is contained, is shown in Table 1. The lighting source is assumed to be a LED light. The message in Table 1 has the format of a LIN message. In case another type of communication bus is used, a format adapted for that communication bus can be applied, wherein basically similar portions of information (e.g., on colour and intensity and on the possible use of lookup tables), if not the same, are conveyed to the network nodes.

TABLE 1

| LIN MSG | Bit 7 | Bit 6 | Bit 5 | Bit 4 | Bit 3 | Bit 2 | Bit 1 | Bit 0 |
|---|---|---|---|---|---|---|---|---|
| Byte 7 | | | | SigColourB | | | | |
| Byte 6 | | | | SigColourG | | | | |
| Byte 5 | | | | SigColourR | | | | |
| Byte 4 | SigEnable Fading | | | SigIntensity | | | | |
| Byte 3 | | SigUpdateColour | | | SigFadingTime | | | |
| Byte 2 | SigEnable_LED | LUT intensity | | SigUse_NAD | LUT colour | | SigGroup3 | |
| Byte 1 | | | | SigGroup2 | | | | |
| Byte 0 | | | | SigNAD_Group1 | | | | | ably all, have the lighting plan stored that comprises the various lighting scenarios. The lighting plan can in embodiments of this invention take the form of a table containing all the lighting scenarios that can be selected. It may provide e.g., the following information:

scenario index→entries for different slave nodes can have the same scenario index in case they belong to each other, i.e., they follow the same sequence of lighting scenarios colour information (e.g., in RGB format or via lookup table entries—see below)

intensity information (e.g., in percentage of a range or via lookup table entries as detailed below)

fading information

LED index which may refer to a single LED, multiple LEDs or all LEDs via a broadcast message which then receive the same colour and intensity information status information is used for pre-loading values or updating them immediately; slave nodes may already update The message shown in Table 1 contains 8 bytes, each of 8 bits. The status {on|off} of the LED light can be directly set via the flag "SigEnable_LED" in Byte2. The value of the two one-bit signals "LUT intensity" and "LUT colour" in Byte2 indicates whether the intensity information (in field SigIntensity) and colour information (in fields SigColourR, SigColourG and SigColourB) is transmitted in lookup table indices or explicitly contained in the message, e.g. as an intensity value (in Table 1 of 7 bit length) in a certain range, for example between 0% and 100% and as 8 bit RGB (red, green, blue) values. In case fading for colour and intensity is enabled via the flag "SigEnableFading", the fading time can be adjusted by "SigFadingTime". The LIN signal SigUpdateColor in Byte3 consists of two bits (hence, it can denote four different states) and is used to inform the LIN slave node what needs to be done with the LED related information:

1. LED information from this LIN message directly transferred to the LED

2. LED information from this LIN message is only stored
3. Stored LED information is transferred to the LED
4. Message is discarded The various lighting scenarios to be used can be represented in lookup tables which carry the lighting information parameters required to control the connected lighting sources on a slave node in the different scenarios. An example of colour and intensity lookup tables is illustrated in Table 2. For each index value the corresponding RGB values and intensity values can readily be read. Obviously, in case monochromatic lighting sources are used, only a light intensity lookup table is needed.

TABLE 2

| Light colour lookup table | | | |
|---|---|---|---|
| Idx | R (red) | G (green) | B (blue) |
| 0 | xr | xg | xb |
| 1 | yr | yg | yb |
| . . . | . . . | . . . | . . . |
| n | zr | zg | zb |

| Light intensity lookup table | |
|---|---|
| Idx | I (intensity) |
| 0 | xi |
| 1 | yi |
| . . . | . . . |
| n | zi |

Figure 7:
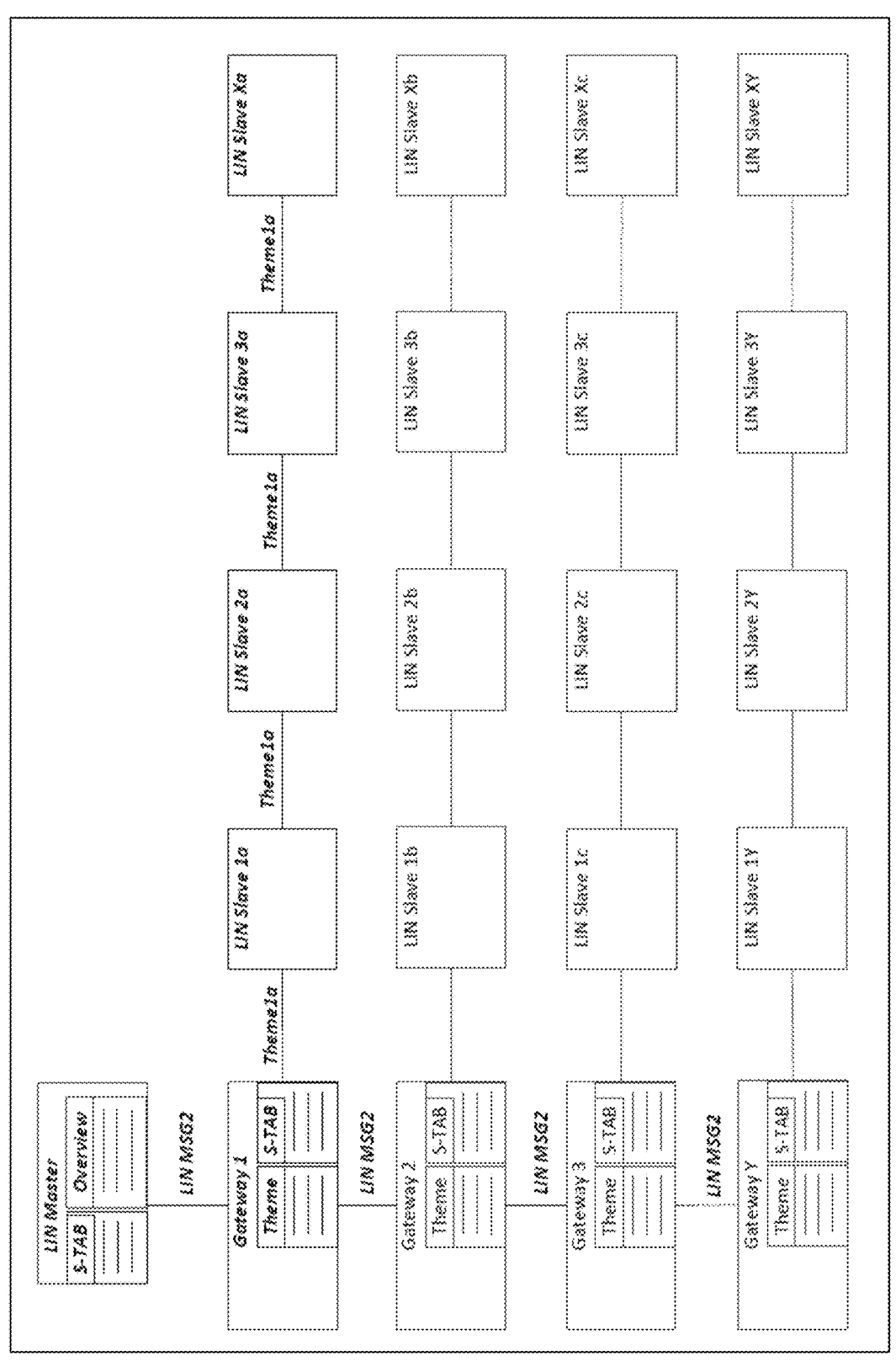
FIG. 7 illustrates a solution according to the present invention wherein the lighting plan is stored in at least one gateway node, in this case in all three gateway nodes.

FIG. 7 illustrates a sequence controlled by a gateway node according to one possible embodiment. The gateway nodes in FIG. 7 each comprise the lighting plan (Theme). The master node comprises an overview of the lighting plan ('Overview') as it has to initiate the communication. The master node sends a message addressed to node 'Gateway1'. On receipt of that message, 'Gateway1' detects it is the destination of the message and maps the request to use a certain lighting scenario into the locally stored lighting plan table and sends fully autonomously all messages to the sub bus as shown in FIG. 7. In other words, compared to the previously described prior art method shown in FIG. 5, wherein the master node updates all slave nodes one by one, so that a given light scenario is displayed, the method shown in FIG. 7 runs much faster, as the various gateway nodes can operate in parallel to provide their respective slave nodes with lighting information.

The master node initiates the sequence by sending a message containing the corresponding gateway node address and the requested scenario. If all gateway nodes should be addressed with the same message, a so-called broadcast address can be used. The message further also contains the address of one particular slave node or, in case a broadcast address is used, to all slave nodes, which should be informed about the requested scenario.

In order to bring the lighting parameter(s) (e.g., colour and/or intensity) to the correct lighting source a two-stage addressing process is used. As already mentioned, the message, e.g., LIN frame message, itself may in some embodiments be a broadcast message. The corresponding gateway network node address(es) (e.g., LIN NAD in case of a LIN bus) can be encoded inside the "SigGroup3" address field which is e.g., 4 bits long. It can be either set to 0, meaning that all gateway nodes are addressed at once, or it can be set to a unique node address between 1 and 15. In case of a 4 bit field as in this example, 15 is the maximum allowed number of nodes based on the LIN specification for the sub bus 20, if the network is a LIN network. The message can be decoded in a first step by all gateway nodes in parallel. Only the addressed gateway nodes can then forward the messages to their connected sub buses (21, 22, 23, a, b, c, . . . Y). In a second step a further decoding is done. The two address fields "SigNAD_Group1" and "SigGroup2" are in this example together 16 bits long. Each bit corresponds to a certain LED being on or off. The first bit is assigned to the LED of the gateway node, provided that it incorporates also a lighting function. The other bits belong to the LEDs which are controlled via the sub bus connected to the gateway node. It allows up to 15 additional LEDs (hence, 15 more slave nodes in case one node drives only one LED and the gateway node also carries a LED) on the sub bus which can be addressed. This corresponds to the maximum allowed numbers of LIN nodes per LIN sub bus.

In the example sketched in FIG. 7 node 'Gateway1' recognizes from message LIN MSG2 its address and a selected light scenario, for example number 1, from the table of lighting scenarios. 'Gateway1' copies the data buffer from its locally stored lighting plan into the local LIN sub bus schedule table, i.e., the scheduler 'S-TAB'. This is just as what was already shown in FIG. 6. Scenario 1 is then transmitted on LIN sub bus "a" as LIN messages 'Theme 1a' in FIG. 7 to the one or more slave nodes that have to apply that scenario. The message comprises amongst other things the colour and intensity information corresponding to the selected scenario, as found e.g., in the lookup table of Table 2.

Consider again a scheme with three gateway nodes, each of them having 10 LIN slaves connected to its LIN sub bus. The master node has to transmit one LIN message to the addressed LIN gateway device to trigger the sequence on that gateway device. Note that in case of a broadcast message, one LIN message is sufficient to address all gateway devices. Afterwards, the addressed LIN gateway node requires 10 LIN messages for updating all slave nodes connected on its LIN sub bus. With 10 ms per message it takes 110 ms to update one sub bus. For a complete update of the network, the LIN master needs to address and to update the three gateway nodes individually. Then the three gateway nodes further update the slave nodes to which they are connected. These 10 messages on the sub buses are sent out in parallel by the LIN gateway nodes 12. It then takes up to 130 ms (3 LIN messages from master+10 LIN messages from gateway nodes with 10 ms per LIN message) to update the complete network. Hence, the reaction time is already reduced with nearly a factor 3 compared to an approach wherein the LIN master updates each slave node individually. However, 130 ms is still too high compared to 50 ms, that a human eye would not see as flickering.

The master device can of course still send out messages when a lighting scenario is running on the communication sub buses. These messages can be used for synchronization purposes by the gateway nodes. Further, also the gateway nodes can send out further messages while a lighting scenario is running to the slave nodes.

Although the gateway nodes as well as the slave nodes have their own oscillators and thus their own time base, the messages can be used in order to re-synchronize again, especially if a lighting scenario is running over a longer time. Each slave node and also each gateway node may re-synchronize on these synchronization messages and use them as a type of 'network timer'.

These embodiments are still not sufficient to transmit colour and intensity information with, for example, a LIN communication bus in case of fast changing sequences in lighting scenarios. The already mentioned low bandwidth of a LIN bus is still a limiting factor. It is just too slow.

Therefore other preferred embodiments are proposed, wherein, instead of transmitting all light information, only lookup table indices are transmitted from which all nodes get instantly their colour and intensity information via the same message, e.g., a LIN message. The message conveys to the various slave nodes information regarding the index (i.e., which scenario) they should select from the lookup table. Each slave node contains a locally stored version of the lookup table.

In some embodiments each node performs a same lighting scenario at the same time. In some embodiments each node performs a same lighting scenario but just shifted in time, brightness or colour. In some embodiments each node performs a different lighting scenario.

In one embodiment the gateway nodes perform only a gateway function to transmit the information from the master node to the slave nodes, i.e., the lighting nodes 13. In other embodiments, as already mentioned previously, the gateway node 12 performs both a gateway function and a lighting function. In that case the gateway node 12 also handles the lighting scenario in the same way as the slave nodes 13 as it also has a unique network address (NAD), which is related to its physical location in the network. Stated otherwise, the gateway node is on the one hand a gateway node but on the other hand also a slave node, arranged in the same way as all the other slave nodes and performing also the same functions.

It is repeated that in preferred embodiments the communication buses are LIN buses, but in other embodiments other types of communication bus can be used, CAN, I2C, SPI being just some examples. It is preferred but not strictly needed that the first communication bus and the one or more second communication buses (i.e., the sub buses) are of the same type. In preferred embodiments the buses between master and gateways and between gateways and slaves are bidirectional.

Figure 8:
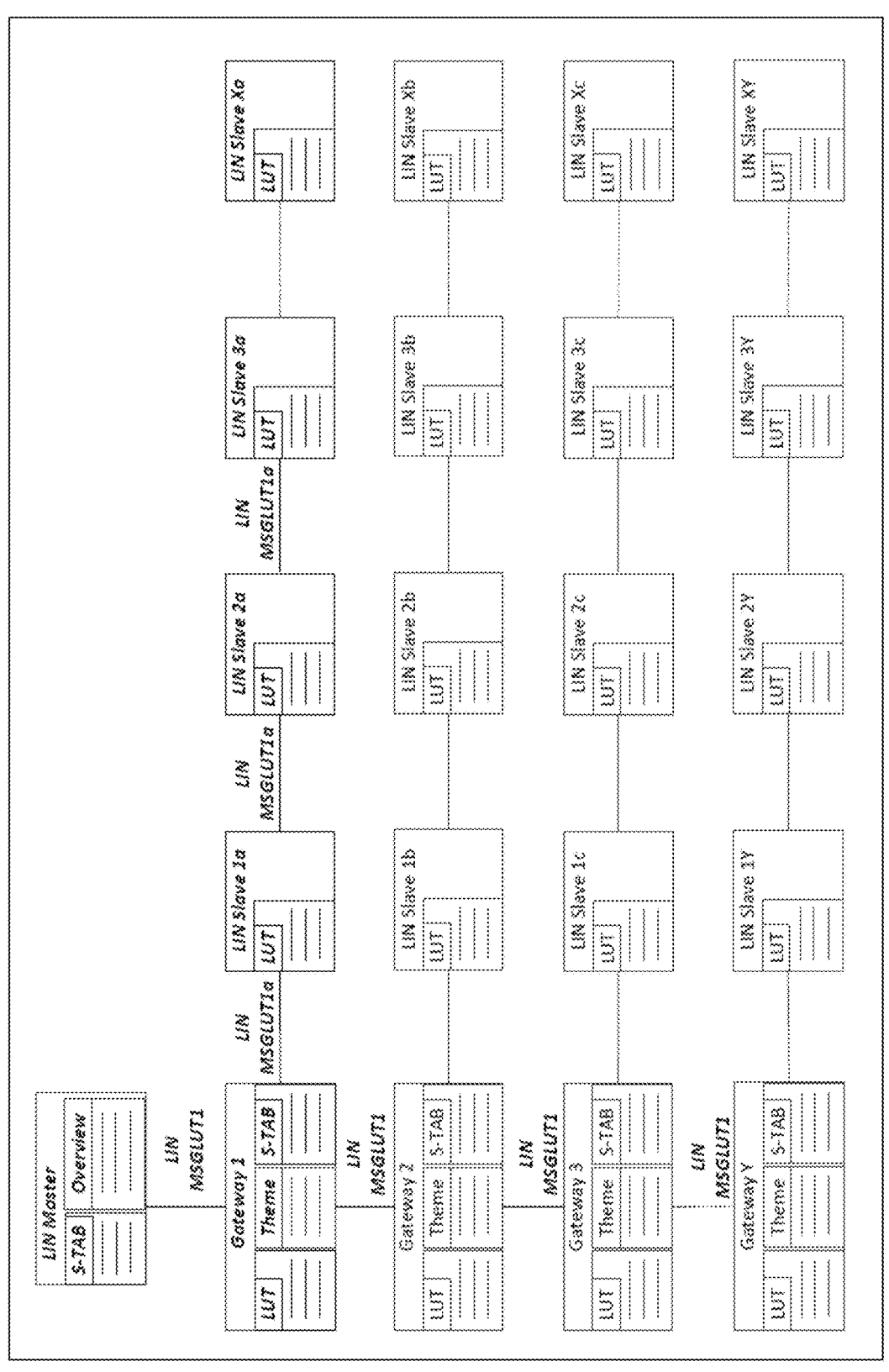
FIG. 8 illustrates a solution according to the present invention wherein lookup tables are applied.

Hence, instead of transmitting all lighting information, only lookup table indices are transmitted from which the nodes get instantly their colour and intensity information via the same message. As previously explained, this requires in the example message depicted in Table 1 setting the appropriate field to indicate colour and intensity information is transmitted via lookup tables. Also, when another type of message than a LIN message is used, this type of information is transmitted. In this way a single message allows informing all network nodes about the colour and intensity they have to apply. FIG. 8 depicts a scheme wherein communication of indices can be applied. Again, an example is taken based on LIN communication buses.

In the example of FIG. 8 the master node 11 again comprises an overview of the lighting plan. The master node provides the lookup table (LUT) indices via LIN MSGLUT1 to the gateway nodes. The gateway nodes each decode the message. However, only the addressed LIN gateway node 'Gateway1' repeats this message on its LIN sub bus "a" in a message LIN MSGLUT1a, so that the correct sub bus "a" will further be addressed.

In some embodiments the slave nodes on sub bus "a" are addressed using a broadcasting address. The LIN slave nodes on sub bus "a" receive message LIN MSGLUT1a in parallel and decode the LIN frame message. Each slave node comprises a local version of the lookup table, as also shown in FIG. 8.

In a preferred embodiment all network nodes (i.e., gateway nodes and slave nodes) use the same lookup table (LUT). In such a preferred embodiment also the lookup table (LUT) indices, which are transmitted by the master node 11 in message LIN MSGLUT1 and by the gateway nodes 12 in LIN MSGLUT1a, are always the same. In embodiments where not all nodes use the same LUT, the tables are different per slave node, but the way of operating remains basically the same.

The master node provides the information from the lighting plan table to all gateway nodes. This may be achieved via separate messages or, in case all gateway nodes are addressed simultaneously, via a broadcast message. The gateway nodes repeat the message to their sub bus. The information comprises amongst other things the lookup table for colour and intensity information already mentioned previously.

The transmitted lookup table (LUT) indices are further used by the slave nodes 13 and possibly by the gateway nodes 12 (if they are arranged to also perform a lighting function) in order to calculate their entry into the lookup table based on their unique physical address, which is, as already said, representative of their physical location in the network. In other words, the unique network address of each lighting node is used to select the lighting scenario. This is further detailed below.

An example of a message based on the use of a LUT is considered. Again, the example of a LIN network is taken. Table 1 can be reused. The lighting sources are again assumed to be LED light. The fields "SigColour{R|G|B}" (in bytes 5, 6 and 7) contain in this example lookup table indices instead of RGB values, as the fields "LUT intensity" and "LUT colour" now indicate that lookup table indices values are to be used for colour and intensity.

Assume the master node sends lookup table indices for e.g., node 'Gateway1' and its connected sub bus 21 according to FIG. 1 or sub bus "a" according to FIG. 8. The following values are assumed for the various fields in the message (see Table 1):

| | | |
|---|---|---|
| SigColourB . . . 0 | SigColourG . . . 0 | SigColourR . . . 0 |
| SigIntensity . . . 0 | | |
| LUT intensity . . . 1 | | |
| LUT colour . . . 1 | | |
| SigGroup3 . . . 1 | SigNAD_Group1 . . . 0xFF | SigGroup2 . . . 0xFF |

The gateway node with the network node address NAD 1 accepts this message. It is further assumed that this gateway node also has a lighting function and thus has e.g., a single RGB LED connected. As already mentioned, the signals LUT intensity=1 and LUT colour=1, SigNAD_Group1=0xFF, make clear that the gateway node LED is one of the LEDs that shall be lit up via a lookup table index. SigColourB=0, SigColourG=0, SigColourR=0 indicate that RGB lookup table indices 0 should be used. SigIntensity=0 indicates that intensity lookup table index 0 should be used.

The same message is conveyed on the connected sub bus 21, because there are multiple LEDs selected via "SIGNAD_Group1" and "SigGroup2" by the value 0xFF for those fields. In one embodiment the LIN sub bus is addressed so that the lowest NAD gets value 1 and the NAD increments up to 15 at most. The gateway node that can also act as a slave node may get NAD value 0. These addresses, unique for that sub bus, have been assigned during an initialization cycle as previously described.

Each node calculates its lookup table indices for example in the following way:

Red_lookup_table_index=SigColourR+NAD−1
Green_lookup_table_index=SigColourG+NAD−1
Blue_lookup_table_index=SigColourB+NAD−1
Intensity_lookup_table_index=SigIntensity+NAD−1

For example, the node with NAD 2 on the LIN sub bus (21, a) takes the lookup table index 1 for its RGB values and intensity value. Using this index values the RGB and intensity values can be read from the lookup table. It can readily be seen that light intensity as well as colour that is emitted by the LEDs connected to a given network node depends on the network node address (NAD) of this network node. As previously described, this unique address also represents the physical location of that node within the network.

In case for example a broadcast address is used to address all slave nodes at once and all slave nodes connected to that sub bus should apply the same scenario (i.e. the same colour and intensity values), it is required to use more than one lookup table per slave node, as a calculation as in the previous paragraph would not work in this case. A preparation cycle may be needed then, wherein the master node informs each slave node which lookup table it is to be applied, for example by means of a classic LIN approach.

The proposed approach with indices allows making the update cycle of the whole network much faster. Again, three gateway nodes are assumed, each of them having 10 slave nodes on their communication sub bus. The master node needs to transmit only three messages (one message for each gateway node to be addressed) plus one message for addressing the slave nodes of the last gateway node that received its address for updating the complete LIN network (i.e., 40 ms when considering 10 ms per message as in e.g., a LIN network). This 40 ms is much faster than the recognition time of a human eye of 50 ms.

Due to the fact that the LIN master provides the LED information to the complete network, the messages automatically also take care of the synchronization. In case of long fading sequences, the master node can continuously send out further messages for synchronization purposes. Although the gateway nodes as well as the slave nodes have their own oscillators and thus their own time base, these messages may be used in order to re-synchronize. Each slave node and also each gateway node may re-synchronize based on these synchronization messages and use them as a type of "network timer".

While a LIN network has been used in the examples to explain the invention, it is understood that on any other network the same approach may be adopted as well. In any case, the displayed colour information is not transported via the network itself. The messages contain e.g., lookup table indices. These lookup table indices are further used by the network nodes in order to derive the lighting information reflecting the lighting scenario that should be displayed by the connected lighting sources.

The network nodes can in some embodiments be implemented as integrated circuits (ICs). The ICs might incorporate network interfaces, memories, central processing unit (CPU), control elements for the connected lighting sources as known in the art.

The lighting plan comprising the various scenarios and/or lookup tables is stored locally in each network node that has a lighting source connected.

In some embodiments these lighting scenarios and/or lookup tables can be provided during one initial manufacturing step wherein an internal non-volatile memory of each network node is programmed. Such a memory may for example be a ROM (read only memory), which is programmed during a manufacturing step of an integrated circuit (IC). Alternatively, it can be a non-volatile programmable memory as e.g., one-time programmable memory (OTP) or a multi-time programmable memory (EEPROM or Flash memory). Such a memory can be programmed with lighting themes and/or lookup tables during a manufacturing step of a lighting module to be connected with a network.

In one embodiment of the invention, the lighting scenarios and/or lookup tables can also be programmed via the network at any time as each network member has a unique network address (NAD). Such a programming step can be performed at any time. Such an implementation might be needed, as the number of scenarios/lookup tables stored in a memory of a network node to be addressed using lookup table indices is limited due to the limited memory size of the network node.

A higher number of scenarios/lookup tables could be stored in the master node, as e.g., a body controller of a vehicle has a bigger memory. This allows a cost optimized solution for implementing different lighting scenarios/lookup tables.

It is certainly of advantage if all gateway nodes and slave nodes contain the same lighting scenarios and lookup tables. In case they would need an update, updating can be done by means of broadcasting addresses, so that network nodes can use the provided data simultaneously and update the lighting scenarios and/or lookup tables. Similarly, as already previously described for the address initialization setting, the update process might need to be performed in cycles. During a first cycle the gateway nodes need to be updated. The update of all gateway nodes is carried out in parallel. During a second cycle all gateway nodes update the slave nodes which they are connected to. Also, this can be performed in parallel. The advantage is that this allows for a short programming time. Especially if lighting scenarios/lookup tables are programmed over the air (OTA) in a vehicle, means the update is provided via a wireless communication interface of a car via a cloud service, short update times are of advantage.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting system comprising a plurality of nodes arranged in a serial network, the lighting system comprising:
a master node,
one or more gateway nodes,
a first communication bus connecting the one or more gateway nodes to the master node,
a plurality of slave nodes, each slave node being connected to a lighting source and arranged for conveying data messages,
one or more second communication buses, each connecting one of the gateway nodes with one or more slave nodes of said plurality of slave nodes,
wherein the one or more gateway nodes are arranged for receiving a unique network address via the first communication bus and the plurality of slave nodes is arranged for receiving a unique network address via one of the second communication buses and
wherein at least one gateway node comprises a lighting plan comprising a plurality of lighting scenarios represented in one or more lookup tables carrying lighting information parameters and one or more slave nodes connected to said one gateway node of the one or more gateway nodes comprise a local version of said one or more lookup tables that is identical to said one or more lookup tables stored in said one gateway node, wherein said one gateway node of the one or more gateway nodes is configured for conveying one or more lookup table indices to one or more slave nodes connected to that gateway node, said one or more slave nodes arranged to control the lighting source based on a lighting scenario of said plurality of lighting scenarios and to calculate a light intensity value and/or colour from the unique network address of the one or more slave nodes and said one or more lookup table indices.

2. The lighting system as in claim 1, wherein the first and the one or more second communication buses are arranged for bidirectional communication.

3. The lighting system as in claim 1, wherein at least one of the gateway nodes is also a slave node connected to a lighting source.

4. The lighting system as in claim 1, wherein the lighting source comprises one or more light emitting diodes, LEDs.

5. The lighting system as in claim 1, wherein one or more slave nodes connected to one of the one or more gateway nodes which are configured for storing the lighting plan, are arranged to control the lighting source based on the lighting plan.

6. The lighting system as in claim 1, wherein the at least one of the one or more slave nodes is configured to calculate one or more indices for the look-up table based on the unique network address.

7. The lighting system as in claim 6, wherein the one or more slave nodes connected to said one gateway node of the one or more gateway nodes all comprise a local version of the one or more look-up tables.

8. The lighting system as in claim 1, wherein all the one or more gateway nodes comprise the lighting plan.

9. The lighting system as in claim 1, wherein the first and the one or more second communication buses are of the same type.

10. The lighting system as in claim 1, wherein at least one of the first and the one or more second communication buses is a LIN communication bus.

11. The lighting system as in claim 1, wherein the one or more slave nodes are each implemented as an integrated circuit and/or wherein the one or more gateway nodes are each implemented as an integrated circuit.

12. The lighting system as in claim 11, wherein the integrated circuit comprises a memory for storing the unique network addresses and/or lighting plan and/or one or more lookup tables.

13. A vehicle lighting system comprising a lighting system as in claim 1.

14. The lighting system as in claim 1, wherein the one or more lookup table indices conveyed to the one or more slave nodes are used to synchronize the one or more slave nodes and the one or more gateway nodes.

15. A lighting system comprising a plurality of nodes arranged in a serial network, the lighting system comprising:
a master node,
one or more gateway nodes,
a first communication bus connecting the one or more gateway nodes to the master node,
a plurality of slave nodes, each slave node being connected to a lighting source and arranged for conveying data messages,
one or more second communication buses, each connecting one of the gateway nodes with one or more slave nodes of said plurality of slave nodes,
wherein the one or more gateway nodes are arranged for receiving a unique network address via the first communication bus and the plurality of slave nodes is arranged for receiving a unique network address via one of the second communication buses and
wherein at least one gateway node comprises a first lighting plan comprising a plurality of lighting scenarios represented in one or more lookup tables carrying lighting information parameters and one or more slave nodes connected to said one gateway node of the one or more gateway nodes comprise a local version of said one or more lookup tables, wherein said one gateway node of the one or more gateway nodes is configured for conveying one or more first lookup table indices to one or more slave nodes connected to that gateway node, said one or more slave nodes arranged to control the lighting source based on a lighting scenario of said plurality of lighting scenarios and to calculate a light intensity value and/or colour based on the unique network address of the one or more slave nodes and on said one or more lookup table indices,
wherein the master node further comprises a second lighting plan comprising a higher number of lighting scenarios and of lookup tables than the one or more gateway nodes, wherein said master node is configured for conveying one or more second lookup table indices to the one or more gateway nodes connected to the master node.

* * * * *